(12) United States Patent
Bidare

(10) Patent No.: US 8,931,060 B2
(45) Date of Patent: Jan. 6, 2015

(54) SYSTEM FOR TWO WAY AUTHENTICATION

(75) Inventor: Prasanna Bidare, Kamataka (IN)

(73) Assignee: Tata Consultancy Services Ltd. (IN)

( * ) Notice: Subject to any disclaimer, the term of this patent is extended or adjusted under 35 U.S.C. 154(b) by 307 days.

(21) Appl. No.: 13/344,762

(22) Filed: Jan. 6, 2012

(65) Prior Publication Data

US 2012/0102551 A1    Apr. 26, 2012

Related U.S. Application Data

(63) Continuation of application No. PCT/IN2010/000564, filed on Jan. 7, 2010.

(30) Foreign Application Priority Data

Jul. 1, 2010    (IN) .......................... 1924/MUM/2010

(51) Int. Cl.
    *H04L 29/06*    (2006.01)
    *H04L 9/32*     (2006.01)
    *G06F 21/32*    (2013.01)

(52) U.S. Cl.
    CPC .............. *H04L 9/3226* (2013.01); *G06F 21/32* (2013.01); *H04L 9/3247* (2013.01); *H04L 2209/80* (2013.01)
    USPC ..................................... 726/4; 2/18

(58) Field of Classification Search
    USPC ..................................................... 726/4, 2, 18
    See application file for complete search history.

(56) References Cited

U.S. PATENT DOCUMENTS

| | | | | |
|---|---|---|---|---|
| 4,879,747 | A * | 11/1989 | Leighton et al. | 713/186 |
| 2006/0174339 | A1 * | 8/2006 | Tao | 726/18 |
| 2006/0206918 | A1 | 9/2006 | McLean | |
| 2007/0174472 | A1 * | 7/2007 | Kulakowski | 709/229 |
| 2008/0235788 | A1 * | 9/2008 | El Saddik et al. | 726/18 |
| 2008/0244700 | A1 * | 10/2008 | Osborn et al. | 726/2 |
| 2009/0210939 | A1 | 8/2009 | Xu et al. | |

* cited by examiner

*Primary Examiner* — Jeffrey Pwu
*Assistant Examiner* — Thong Truong
(74) *Attorney, Agent, or Firm* — Robert Plotkin, P.C.

(57) ABSTRACT

A system and method for online authentication having at least two levels of authentication has been disclosed. The two levels of authentication provide total security of privileged information by requiring users to authenticate themselves in two stages/levels. The first level of authentication involves simple alphanumeric password verification, which if successful, is followed by a second level of graphical password verification. The graphical password verification is based on the novel concept of challenging users with a dotted grid to enable users to create a non-definable vector pattern of definitive lines by sequentially joining pre-determined dots in the grid.

15 Claims, 3 Drawing Sheets

SYSTEM FOR TWO WAY AUTHENTICATION

CROSS-REFERENCE TO RELATED APPLICATIONS

This application is a continuation of commonly-owned PCT patent application serial number PCT/IN2010/000564, filed on Jan. 7, 2010, entitled, "System for Two Way Authentication," which is hereby incorporated by reference herein, which claims priority under 35 U.S.C. §119(a) from Indian application 1924/MUM/2010, filed Jul. 1, 2010, entitled "System for Two Way Authentication."

FIELD OF THE INVENTION

The present invention relates to the field of online security.
Particularly, the present invention relates to providing secure access to privileged information.

BACKGROUND OF THE INVENTION AND PRIOR ART

Internet-enabled-services are a part of everyone's day to day life, right from online banking, bill payment, trading and purchase to tracking information, enterprise data banks and social networking. Internet-enabled-services have a strong presence and provide convenience which makes them indispensable.

Internet-enabled-services like online banking, trading and purchase require users to register with these services by creating an account and selecting a password for accessing each of these services. Using the account ID and password, users can access the privileged/sensitive information and perform the desired transactions.

The account ID and password are allotted to each user to ensure that the privileged information of users is secure. However, the alphanumeric password though being the most popular and economical authentication method, compromises a lot on security as most of the passwords are weak passwords. Users select passwords which are easy to remember and recall, and which are often combinations of proper nouns like names of their acquaintances, popular words and are therefore prone to dictionary attacks or brute force attacks and very easy for attackers to guess. Further, if the length of the password is increased for security reasons, users tend to write them down resulting in breach in the end.

In addition, policies of certain systems require users to frequently change their passwords, which make them hard to remember and again, users often write down their passwords which often leads to password theft.

When dealing with online security one has to also deal with attacks such as Phishing and MITM (Man in the middle) attacks.

Phishing attacks are attacks where a user creates a site website which appears similar to a legitimate website. But when the user accesses the legitimate website he/she is presented the phishing website where the user thinking that it is legitimate enters his/her login credentials and the attacker gets access to the users' credentials and privileged information in real time.

In MITM attacks; the attacker has a secure connection with the legitimate website and the user. When the user enter his account ID, the attacker forwards the ID to the legitimate website and receives an indicator, typically an image and some text, and duplicates it and presents it to the user. The user thinking it's a legitimate site enters his credentials/privileged information which is then available to the attacker.

The privileged information can include user's credit card/debit card details, online banking login details, trading account details and the like which on going in the wrong hands may burden users with huge financial losses. Therefore, secure authentication and back end secured authorization systems are becoming the need of the hour to secure the transactions of users.

To overcome the aforementioned shortcomings of the conventional authentication systems, biometric password provide the best remedy. As biometric validates the true identity of a user and no two users can have the same biometric signature. However, biometric systems are expensive to implement and if hacked, users completely loses their identity. Hence, most users and BFI (Banking & Financial Institutes) do not want to introduce biometric for Internet based transactions as one of the approved challenge. However, biometric may prove its usefulness in corporate world and at Governmental entry access process.

There have been various attempts in the prior art to overcome the phishing and MITM attacks without the need of deploying expensive biometric systems.

Particularly, US/2006/0206918 discloses a system and method for input of a password which has unique non-descriptive graphical features using unique text-based characters via a wireless telecommunication device. The keys of the device are assigned unique non descriptive graphical features which appear on the screen when the keys are pressed and authenticated by the disclosed system.

The non descriptive graphical password disclosed by this patent application only relies on two dimensions of the graphical password i.e. non descriptive features and sequence of selection. Moreover, there is only a single level of authentication and the graphical password is not encrypted hence can be hacked easily.

Further, US/2009/00210939 discloses a graphical password authentication method which is based on sketches drawn by a user. The method extracts a template edge orientation pattern from an initial sketch of the user and an input edge orientation pattern from an input sketch of the user, compares the similarity between the two edge orientation patterns and makes an authentication decision based on the similarity.

This disclosure as well provides a non-descriptive password which is based on only two dimensions i.e. a predetermined sketch and edge orientation. Additionally, the authentication process is restricted to wireless telecommunication device.

Therefore, it is felt that there is a clear need for a system which provides a robust authentication system which:
provides a multidimensional graphical password to increase the strength of the password;
provides encryption of the graphical password for added security; and
provides authentication to be carried out on any customer owned telecommunication/electronic device.

OBJECTS OF THE INVENTION

It is an object of the present invention to provide a secure online authentication system.
It is another object of the present invention to provide a cost effective authentication system.
It is still another object of the present invention to provide a highly scalable authentication eco system to address ubiquity.

It is yet another object of the present invention to provide challenges on user owned computing device/mobile handsets as golden key.

One more object of the present invention is to provide a system which overcomes phishing and MITM attacks.

SUMMARY OF THE INVENTION

The present invention envisages an online authentication system having at least two levels of authentication wherein at least a first level of authentication includes accepting a user name and an alphanumeric password and a second level of authentication in a system of online two level authentication comprising:

a plurality of client devices having:
- sensing means adapted to sense an incoming authentication request on the client device on successful completion of the first level of authentication and provide a sensed signal;
- graphical display means adapted to display a dotted grid on a display of the client device on receiving the sensed signal;
- means to reproduce a vector pattern comprising definitive lines formed by sequentially joining pre-determined dots in the dotted grid to create a 'non-definable' graphical password;
- accepting means adapted to receive the 'non-definable' graphical password and generate an accepted password;
- encoding means adapted to receive the accepted password and encode the accepted password into a unique signature;
- transmitter means adapted to transmit the unique signature over a wireless communication channel;

a web server remotely co-operating with the client devices, the web server having:
- a repository to store user credentials and their pre-selected 'non-definable' graphical passwords, the repository including a lookup table to match user's client device identification number with the pre-selected 'non-definable' graphical password;
- receiving means adapted to receive the unique signature from the client device along with client identification number;
- decoding means adapted to decode the unique signature and provided a decoded password;
- pattern matching means adapted to match the decoded password and the client identification number with corresponding entry in the lookup table and further adapted to generate a status indicator; and
- authorization means adapted to grant access to privileged information/service/URL to users based on a success status indicator.

The vector pattern may comprise at least three definitive lines.

The client device is selected from the group of devices consisting of a mobile phone, a wireless telecommunication device, a personal digital assist, a node, a personal computer, a laptop, a digitizer and a notebook.

Typically, the means to reproduce the 'non-definable' graphical password is selected from the group of devices consisting of a stylus, direction keys of the client device, pre-designated keys provided on the keypad of the client device and touch screen interface of the client device.

The accepting means may accept the reproduced 'non-definable' graphical password in the form of co-ordinates of the reproduced pattern on the dotted grid.

Preferably, the transmitter means transmits the unique signature over the wireless communication channel in forms selected from the group consisting of text message, multimedia message and packet based data.

Typically, the client device includes an embedded application for providing the at least two levels of authentication and the embedded application comprises a simulation tool to enable users to practice the graphical password.

Further, the web server comprises registration means adapted to register users and their details including the name, IP address/identification number of the client device, the predetermined username, alphanumeric password and the predetermined 'non-definable' graphical password.

Furthermore, the web server comprises a fraud detection tool to capture and identify client device characteristics, geo position and or behavior to detect suspect transactions.

The present invention envisages a method for providing online authentication for secure access to Internet enabled services, the method comprising the following steps:

a. registering a username, an alphanumeric password, a non-definable graphical password and a client device identification number for each user;
b. storing the registration details in a repository;
c. sensing a request for a first level of authentication;
d. accepting a username and a alphanumeric password for the first level of authentication;
e. displaying a dotted grid on a client device on successful completion of the first level of authentication;
f. providing tools for drawing a non-definable graphical password on the client device;
g. accepting the graphical password;
h. encoding the graphical password;
i. transmitting the encoded graphical password to a web server for verification;
j. decoding the graphical password;
k. matching the decoded graphical password with the stored non-definable graphical password; and
l. authorizing the user to access the Internet enabled service if the graphical passwords match.

Typically, the step of registering the non-definable graphical password includes the step of providing a vector pattern by sequentially joining pre-determined dots to form definitive lines on a dotted grid.

Preferably, the step of encoding the graphical password includes the step of converting the graphical password to a unique signature.

The step of transmitting the encoded graphical password may include the steps of packing the encoded graphical password in a text message/multimedia message/in the form of data packets and sending over the wireless communication channel.

In accordance with the present invention, the step of matching the decoded graphical password includes the step of matching the sequence followed for connecting the dots, the positions of the connected dots, the length of the connected dots, the direction of the connected dots and the pattern formed by connection of the dots with the stored graphical password to verify the authenticity of the graphical password.

BRIEF DESCRIPTION OF THE ACCOMPANYING DRAWINGS

The invention will now be described in relation to the accompanying drawings, in which.

DESCRIPTION OF THE INVENTION

Figure 1:
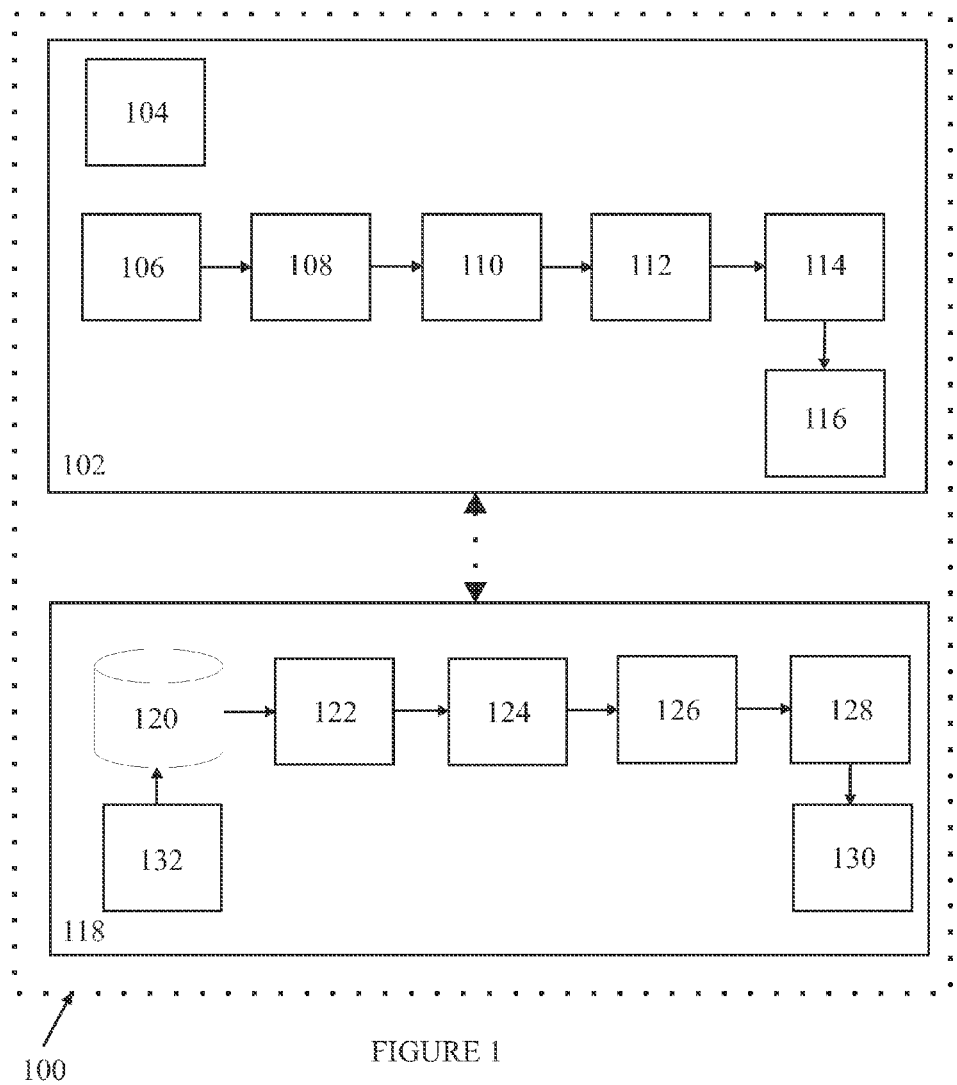
FIG. 1 illustrates the schematic of the system for providing two way authentications in accordance with the present invention.

To overcome the problems of the conventional online authentication systems and to provide a robust and secure authentication system, the present invention envisages a two way authentication system which eliminates the occurrence of phishing and Man In The Middle (MITM) attacks, gives users the confidence that their login credentials and financial details cannot be hacked and that their privileged information is safe.

The present invention envisages a two way authentication system which provides total security of privileged information by requiring users to authenticate themselves in two stages/levels.

In accordance with the present invention, the phishing and MITM attacks are eliminated because the system authenticates users on user's mobile device/client device. Hence, even if users are accessing privileged information on a node, at least one level of the authentication is directed/carried out on the user's personal mobile device.

In accordance with one aspect of the present invention, the first level of authentication involves simple alphanumeric password verification, which if successful, is followed by a second level of multidimensional graphical password verification. The multidimensional graphical password verification is based on the novel concept of challenging users with a dotted grid typically in sizes of 6 by 6 and/or use of 5 by 7 dot matrix, to develop user's graphical password or multiple dot matrix grids if the user's computing device can accommodate it. In accordance with this invention, users create the multidimensional graphical passwords by joining the dots in the grid, vectorially to form definitive lines.

In accordance with another aspect of the present invention, the graphical password verification is carried out on user's client device like cell phone/mobile phone, PDA, laptop, notebook, personal computer and digitizer. The grid for entering the graphical password is streamed automatically on a user's client device when the user attempts to access privileged information on a subscribed website. Alternatively, the client device will be embedded with a custom application which will display the dotted grid and create a unique signature for the entered graphical password and send the signature as a text message or in the form of a packet to a web server. The value of the signature is session specific and hence hack resistant. Since the graphical password is sent in the form of a signature over the network, it cannot be hacked or decoded by an attacker. The central server verifies the password and if authentic enables the user to access the website either on the node to which the user is connected or on the user's mobile device.

Further, back end communication from users mobile will use Client Device Identification (CDI) which is extremely valuable antifraud tool that helps identify suspicious transactions. By capturing and identifying device characteristics during the login process, CDI goes beyond simple user names and passwords to detect suspect mobile transactions at the device level.

It is designed to differentiate individual devices visiting a site or a same device visiting different applications regardless of the past registration in conjunction with the credentials presented or the connection (telecom carrier or IP address). Such parameters and real-time reporting creates a full picture of the user for the fraud detection engine at the other end of the line, whether a mobile phone, PDA, smart phone, PC or networked gaming console, such as a PSP or Xbox. The more comprehensive the picture created, the harder it will be for a fraudster to forge.

In accordance with still another aspect of the present invention, while setting up the graphical password, the user registers his details and mobile number with the service provider and is then inducted through a training phase. In the training phase, the user at the Internet-enabled service provider's premise selects an alphanumeric and a graphical password. The multidimensional graphical password which is a key aspect of the two-way authentication system is formed by sequentially drawing/joining pre-determined dots in a grid. The multidimensional graphical password is not a mere connection of dots but is multidimensional complex password as the sequence in which the dots are joined, the direction, the position of the dots in the grid and the length of the line formed by joining the dots for forming a particular pattern are important. This kind of password does offer behavioral pattern of the user during authentication process. If the sequence, the number of dots, position of dots and the orientation of the dots is incorrect, the graphical password is rejected. Hence, while setting up the graphical password the user is made to practice the graphical password multiple times till the time the user does memorize and attain perfection in it. Additionally, the custom application embedded on the user client device includes a simulation tool using which the users can practice the graphical password.

Every person has a different psychology and different traits. These characteristics give every individual a unique style of performing tasks, for instance, even if there is known X number of way of solving a puzzle, depending on one's psyche, one may not follow the X way but solve the same puzzle in a new Y way. Thus, this unique psyche is captured as an essence of the graphical passwords and the training phase enables the user to learn and re-learn this pattern making, which is easy to recall by individuals from their human memory.

In accordance with yet another aspect of the present invention, the graphical password must be selected by following the below requirements:
  the lines formed by joining the dots in the grid must be definitive i.e. of a particular length;
  the graphical password must be created by joining pre-selected dots to create a pattern involving at least three lines;
  the complexity of the password can be increased by increasing the number of lines in the password;
  the sequence, orientation, length of the lines formed by joining the dots must be preserved; and
  Thus created pattern must not conform to any known pattern and or to any lexicography.

In accordance with a further aspect of the present invention, users can draw/join the dots provided in the grid with the help of a stylus, typically provided with the client device, the direction keys/pre-designated provided on the keypad of the client device or a touch screen. As the graphical password entry is performed via a client device, the phishing and MITM attacks are completely eliminated making the two-way authentication process envisaged by the present invention robust and secure. In two way authentication process, user identifies the target server with right full challenge response sequence and server identifies the user by users behavior, geo location, device credentials and one time number pass words. The sense of security in turn increases the sales/visits to e-commerce sites as the user is assured that his/her financial details will not be hacked and misused.

Referring to the accompanying drawings, FIG. 1 shows the schematic of the two-way authentication system proposed by the present invention. The authentication process is carried out at two levels of which at least one level of authentication takes place on users' personal mobile device.

In accordance with the present invention, the system 100 comprises of a plurality of client devices 102 which communicate to a web server 118.

When a user registers with a service provider for accessing the Internet-enabled service provided by them, he/she is required to register with the registering means 132 provided at the web server 118 and select a user ID and an alphanumeric password for a first level of authentication and a non-definable graphical password for a second level of authentication. While registering for the service, the user provides his details and his client device identification number so that at least one level of the authentication process can be routed to the user's personal client device. These details are stored in a repository 120 at the web server 118. The repository 120 includes a lookup table which matches the user's client device identification number with the pre-selected 'non-definable' graphical password to facilitate easy and quick verification of the password.

While selecting the graphical password, the user is presented with a dotted grid, using the dots the user is expected to create a vector pattern comprising definitive lines (joining the dots) to obtain his/her non-definable graphical password. The graphical password, in accordance with the present invention, involves the user to remember the sequence in which the dots were joined, the number of dots selected for creating a line and the direction of the line, as behavioral pass. In addition, the graphical password requires that the user creates a vectorial pattern involving at least three lines. This complexity makes the graphical password multidimensional, robust and secure.

In the training phase i.e. during the registration phase, the user is provided with a simulation tool 104 which enables the users to practice and master a graphical password of their choice. Once the graphical password is mastered, this password and the user details are stored in the repository 120 at the Web Server 118.

The simulation tool 104 also enables the users to practice the graphical password to master the pattern at later stages once the pattern has been registered. Thus, users can activate this tool and try the pattern offline in case they wish to determine if they can correctly recollect the pattern before the actual challenge.

In accordance with this invention, the two-way authentication system can be accessed by the users on their personal client device 102. Typically, client device 102 includes a laptop, a workstation, a personal computer (node), a notebook, a mobile phone, a PDA, a digitizer or any wireless telecommunication device. If the user is accessing a website which has deployed the proposed authentication system, via a node, the first level authentication can be performed either on the node or on the personal mobile device. The first level of authentication is simple alphanumeric password verification. The second level of strong authentication always takes place only on the personal mobile device of the user, thus eliminating phishing and MITM attacks. And the transaction can be carried out on node and or mobile.

The client device 102 of the user is preferably embedded with a custom application which enables the registered users to perform the authentication process. Alternatively, when the user attempts to access an online service, the authentication process in real-time can be streamed/downloaded on the users registered client device.

Figure 2:
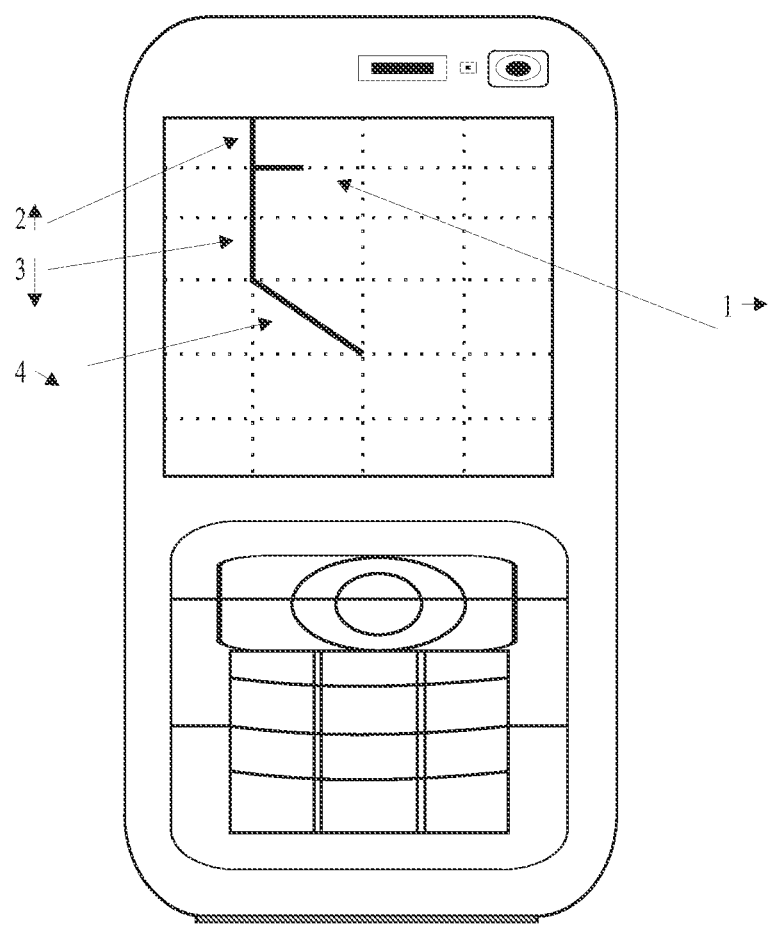
FIG. 2 illustrates a type of graphical password created using the proposed system, in accordance with the present invention.

The first level of authentication requires the user to enter a simple user ID and alphanumeric password. If the first level authentication is successful, the user is challenged with a dotted grid in which the user draws his/her graphical password. The sensing means 106 of the custom application embedded on the client device 102 senses the signal from the web server 118 to display the dotted grid for the users. The graphical display means 108 prepares the dotted grid and displays it on the screen of the client device 102. The user then using a stylus, touch screen or designated keys represented by 110 of the device reproduces the graphical password on the dotted grid. FIG. 2 shows an example of a graphical password created on a personal mobile device. The password as seen in FIG. 2 is formed by four lines and the reference numerals 1, 2, 3 and 4 show the direction and sequence in which the graphical password is created.

This graphical password is received by an accepting means 112 which retrieves the co-ordinates/pattern of the graphical password on the grid corresponding to the selection made by the users. Along with the co-ordinates the accepting means also accepts the details of the pattern including the sequence, length and direction. These co-ordinates/patterns and details are encoded into a unique signature by an encoding means 114. The signatures' are highly session specific. The graphical password is encoded to ensure that the vectorial pattern of the password cannot be hacked or decoded by a malicious user. The encoded graphical password signature is then sent to a transmitter means 116 which automatically creates a text message/MMS (MultiMedia Message Service) in the background without the involvement of the user and sends the message over the wireless communication channel to the web server 118 for authorizing the user. Here, in this solution, the actual shape and size of the graphical password remains close to user only. Hence the hacker has less or no value for the hash if he succeeds in tapping. Thus the process is hack resistant.

A receiving means 122 at the web server 118 receives the signature and decodes it using a decoder 124. The decoded signature is then given to a pattern matching means 126 which based on the personal communication device CDI and mobile number and the user ID matches the signature with a stored pattern for that user. If the comparison gives a perfect match then an authorization means 128 gives the user access to the service either on the node or on the personal mobile device representing the selected client device 102.

The signature will also use, Client Device Identification (CDI) which is extremely valuable antifraud tool that helps identify suspicious transactions. By capturing and identifying device characteristics during the login process, CDI goes beyond simple user names and passwords to detect suspect mobile transactions at the device level.

It is designed to differentiate individual devices visiting a site or a same device visiting different application, regardless of past registration in conjunction with the credentials presented or the connection (telecom carrier or IP address). Such parameters and real-time reporting can create a full picture of the user for a fraud detection engine 130 at the other end of the line, whether a mobile phone, PDA, smart phone, PC or networked gaming console, such as a PSP or Xbox. The more comprehensive the picture created, the harder it will be for a fraudster to forge.

The authorization means 128 preserves the IP address of the node during the first level of authentication and in case the user is accessing the service via the node, the authorization means 128 enables access to the service on this node.

Additionally, the web server comprises the fraud detection engine 130 which traces all the activities of the client devices 102 by intelligently tracking the CDI characteristics and based on the same detecting and blocking suspect mobile transactions.

In accordance with this invention, if the user forgets the password he/she will have to reset the password at the service provider's premise thus removing the option of the attackers to change the password by the 'forgot password' link. In addition, even if the phone is stolen or misplaced, the dotted grid challenges the attacker, only if the sequence, orientation and length and position of dots are correct, then access is provided. Hence, the solution is claimed to be hack resistant.

Figure 3:
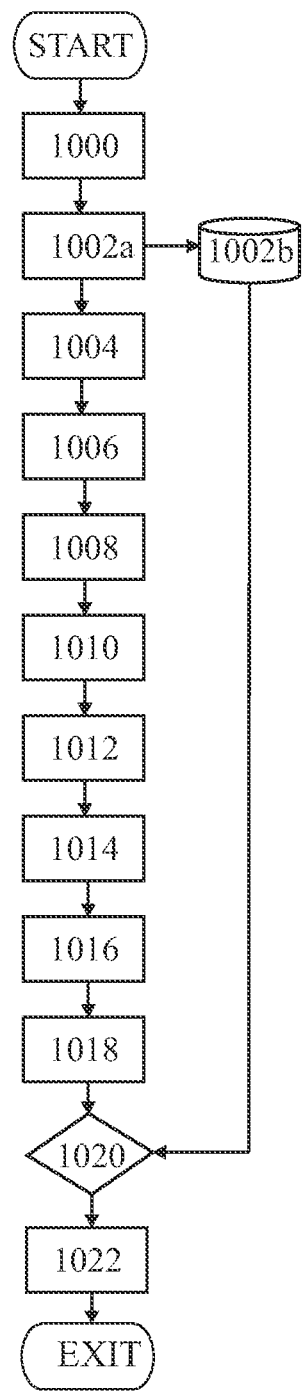
FIG. 3 is a flowchart showing the steps for providing two way authentications in accordance with the present invention.

In accordance with the present invention, there is envisaged a method for providing online authentication for secure access to Internet enabled services, the method comprising the following steps as seen in FIG. 3:

- registering a username, an alphanumeric password, a non-definable graphical password and a client device identification number for each user, 1000;
- storing the registration details in a repository, 1002;
- sensing a request for a first level of authentication, 1004;
- accepting a username and a alphanumeric password for the first level of authentication, 1006;
- displaying a dotted grid on a client device on successful completion of the first level of authentication, 1008;
- providing tools for drawing a non-definable graphical password on the client device, 1010;
- accepting the non-definable graphical password, 1012;
- encoding the non-definable graphical password, 1014;
- transmitting the encoded graphical password to a web server for verification, 1016;
- decoding the graphical password, 1018;
- matching the decoded graphical password with the stored non-definable graphical password, 1020; and
- authorizing the user to access the Internet enabled service if the graphical passwords match, 1022.

TECHNICAL ADVANTAGES

The technical advancements of the present invention include:

- providing a robust and secure authentication system;
- providing an authentication solution which involves a two level and secured authorization process;
- providing an authentication system which redirects the second level authorization process typically on user's personal mobile device thereby eliminating phishing and MITM attacks;
- providing an authentication system in which the second level of authentication is performed by challenging users with a grid in which a non-definable graphical password is to be entered;
- providing a system in which the non-definable graphical password involves the complexities of sequence, length, position of dots and orientation;
- providing a system in which the graphical password is encoded into a session specific signature which is automatically sent to a Web Server from the client's personal mobile device without the need of human intervention;
- providing a system in which the encoded graphical password signature is transmitted over the wireless communication channel as a text message thus utilizing minimum channel bandwidth;
- providing a system in which the graphical password is secure as the graphical password is encoded into a unique signature and inserted in a text message which cannot be decoded by malicious users;
- providing a system which enables the users to access the online services on a node despite carrying out the authentication on users personal mobile communication device;
- providing a system which enables the users to practice the graphical password on a simulation tool before registering the password with the system; and
- providing a cost effective system which requires minimum infrastructure and therefore less cost of deployment.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A computer-implemented online authentication system having at least two levels of authentication including a first level of authentication and a second level of authentication, said system comprising:

a plurality of client devices having:
- sensing means adapted to sense an incoming authentication request on said client device on successful completion of the first level of authentication and provide a sensed signal;
- graphical display means adapted to generate a grid comprising dots having pre-determined coordinates, said graphical display means further adapted to display the grid on a display of the client device on receiving the sensed signal;
- drawing means to reproduce a vector pattern comprising definitive lines formed by sequentially joining pre-determined dots in the grid, wherein the vector pattern has a specific length and a specific direction and passes through specific coordinates in the grid, the drawing means to reproduce further configured to produce a graphical password comprising the vector pattern;
- accepting means adapted to receive the graphical password and to generate an accepted password, wherein the accepted password includes the vector pattern;
- encoding means adapted to receive the accepted password and to encode the accepted password into a unique signature;
- transmitter means adapted to transmit the unique signature over a wireless communication channel;

a web server remotely co-operating with the client devices, the web server having:
- a repository to store user credentials and graphical passwords, each of the graphical passwords having a corresponding specific length, specific direction, specific pattern, and specific coordinates, said repository having a lookup table to match a user's client device identification number with a graphical password in the repository;
- receiving means adapted to receive the unique signature from the client device along with a client device identification number;
- decoding means adapted to decode the unique signature and provided a decoded password;

pattern matching means adapted to match the length, direction, pattern, and coordinates corresponding to the decoded password and the client device identification number with a corresponding entry in the lookup table and further adapted to generate a status indicator; and authorization means adapted to grant access to privileged information/service/URL to users based on a success status indicator, wherein the success status indicator is generated only in the event that the pattern, length, direction, and coordinates corresponding to the decoded password exactly match the pattern, length, direction, and coordinates of the stored defined graphical password.

2. The computer-implemented system as claimed in claim 1, wherein the vector pattern comprises at least three definitive lines.

3. The computer-implemented system as claimed in claim 1, wherein the client device is selected from the group of devices consisting of a mobile phone, a wireless telecommunication device, a personal digital assist, a node, a personal computer, a laptop, a digitizer and a notebook.

4. The computer-implemented system as claimed in claim 1, wherein the drawing means to reproduce the graphical password is selected from the group of devices consisting of a stylus, direction keys of the client device, pre-designated keys provided on the keypad of the client device and touch screen interface of the client device.

5. The computer-implemented system as claimed in claim 1, wherein the accepting means accepts the reproduced graphical password in the form of co-ordinates of the reproduced pattern on the grid.

6. The computer-implemented system as claimed in claim 1, wherein the transmitter means transmits the unique signature over the wireless communication channel in forms selected from the group comprising of text message, multimedia message and packet based data.

7. The computer-implemented system as claimed in claim 1, wherein the client device includes an embedded application for providing the at least two levels of authentication.

8. The computer-implemented system as claimed in claim 1, wherein the client device includes an embedded application, the embedded application comprising a simulation tool to enable users to practice the graphical password.

9. The computer-implemented system as claimed in claim 1, wherein the web server comprises registration means adapted to register users and their details including the name, IP address/identification number of the client device, the pre-determined username, alphanumeric password and the graphical password.

10. The computer-implemented system as claimed in claim 1, wherein the web server comprises a fraud detection engine to capture and identify client device characteristics, geo position and behavior to detect suspect transactions.

11. A method for providing online authentication for secure access to Internet enabled services, said method comprising the following steps:
  a. registering a username, an alphanumeric password, a graphical password and a client device identification number for each user, wherein the registered graphical password includes a vector pattern having a specific length and a specific direction and passes through specific dots having pre-determined coordinates in a grid;
  b. storing the registration details in a repository;
  c. sensing a request for a first level of authentication;
  d. accepting a username and a alphanumeric password for the first level of authentication;
  e. generating a grid comprising dots having pre-determined coordinates and displaying the grid on a client device on successful completion of the first level of authentication;
  f. providing tools for drawing a graphical password on the client device, wherein the graphical password comprises a vector pattern having a specific length and a specific direction and passes through dots having specific coordinates;
  g. accepting the graphical password;
  h. encoding the graphical password into a unique signature;
  i. transmitting the encoded graphical password in the form of the unique signature to a web server for verification;
  j. decoding the unique signature at the web server into the graphical password;
  k. matching the pattern, length, direction, and coordinates of the decoded graphical password with the pattern, length, direction, and coordinates of the registered graphical password; and
  l. authorizing the user to access the Internet enabled service only in the event that the pattern, length, direction, and coordinates of the decoded graphical password exactly match the pattern, length, direction, and coordinates of the registered graphical password.

12. The method as claimed in claim 11, wherein the step of registering the graphical password includes the step of providing a vector pattern by sequentially joining pre-determined dots having pre-determined coordinates to form definitive lines on a dotted grid.

13. The method as claimed in claim 11, wherein the step of encoding the graphical password includes the step of converting the graphical password to a unique signature.

14. The method as claimed in claim 11, wherein the step of transmitting the encoded graphical password includes the steps of packing the encoded graphical password in a text message/multimedia message/in the form of data packets and sending over the wireless communication channel.

15. The method as claimed in claim 11, wherein the step of matching the pattern, length, direction, and coordinates of the decoded graphical password with the pattern, length, direction, and coordinates of the registered graphical password further includes matching the sequences followed for connecting the dots in the grid.

* * * * *

UNITED STATES PATENT AND TRADEMARK OFFICE
CERTIFICATE OF CORRECTION

PATENT NO. : 8,931,060 B2  
APPLICATION NO. : 13/344762  
DATED : January 6, 2015  
INVENTOR(S) : Bidare Page 1 of 1

It is certified that error appears in the above-identified patent and that said Letters Patent is hereby corrected as shown below:

On the title page, item 75, under "Inventor", in Column 1, Line 1, delete "Kamataka" and insert -- Bangalore --, therefor.

On the title page, item 63, under "Related U.S. Application Data", in Column 1, Line 2, delete "Jan. 7, 2010." and insert -- Aug. 27, 2010. --, therefor.

Signed and Sealed this  
Twenty-fourth Day of May, 2016

Michelle K. Lee  
*Director of the United States Patent and Trademark Office*